United States Patent [19]

Komiya et al.

[11] Patent Number: 5,365,048
[45] Date of Patent: Nov. 15, 1994

[54] BAR CODE SYMBOL READING APPARATUS WITH DOUBLE-READING PREVENTING FUNCTION

[75] Inventors: Chikako Komiya; Hisakatsu Tanaka, both of Tokyo, Japan

[73] Assignee: Olympus Optical Co., Ltd., Tokyo, Japan

[21] Appl. No.: 18,878

[22] Filed: Feb. 17, 1993

[30] Foreign Application Priority Data

Feb. 20, 1992 [JP] Japan .................................. 4-033533
May 28, 1992 [JP] Japan .................................. 4-136725

[51] Int. Cl.⁵ .............................................. G06K 7/10
[52] U.S. Cl. .................................. 235/462; 235/463; 235/472
[58] Field of Search ........................ 235/462, 463, 472

[56] References Cited

U.S. PATENT DOCUMENTS 4,958,064  9/1990  Kirkpatrick .......................... 235/470
5,019,699  5/1991  Koenck ................................ 235/470

FOREIGN PATENT DOCUMENTS 53-3885   2/1978  Japan .
64-61886  3/1989  Japan .
2-23483   1/1990  Japan .
4-21231   4/1992  Japan .

OTHER PUBLICATIONS

X–English Abstract.
*–Partial translation.

Primary Examiner—Harold Pitts
Attorney, Agent, or Firm—Frishauf, Holtz, Goodman & Woodward

[57] ABSTRACT

A comparing section compares the coordinates of the four corners of a bar code symbol newly detected by a bar code symbol detecting section and stored in a primary buffer, with the coordinates of the four corners of a bar code symbol having been detected and stored in a secondary buffer. If the coordinates of the newly detected bar code symbol differ from those of the detected bar code symbol, a control section causes a decoding section to decode the bar code symbol on the basis of image data stored in a frame memory. On the other hand, if not so, it is determined that the newly detected bar code symbol is invalid, thereby inhibiting decoding of the same to prevent double-reading.

17 Claims, 12 Drawing Sheets

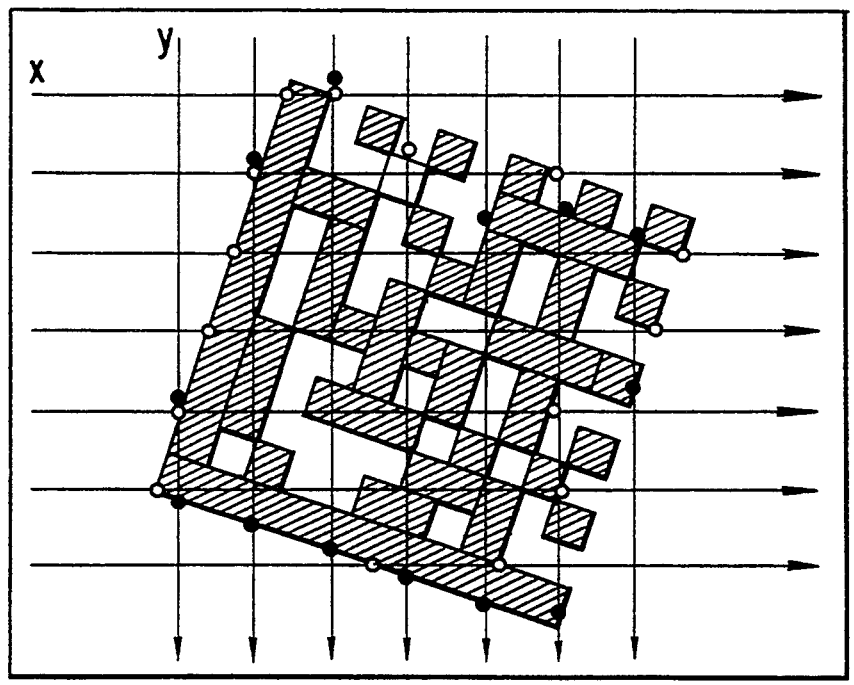
F I G. 4
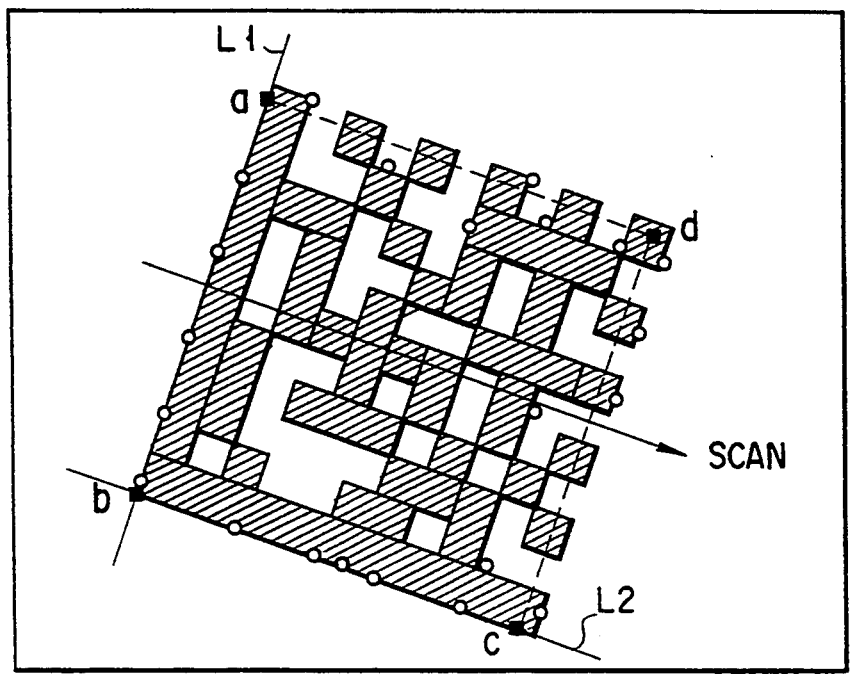
F I G. 5

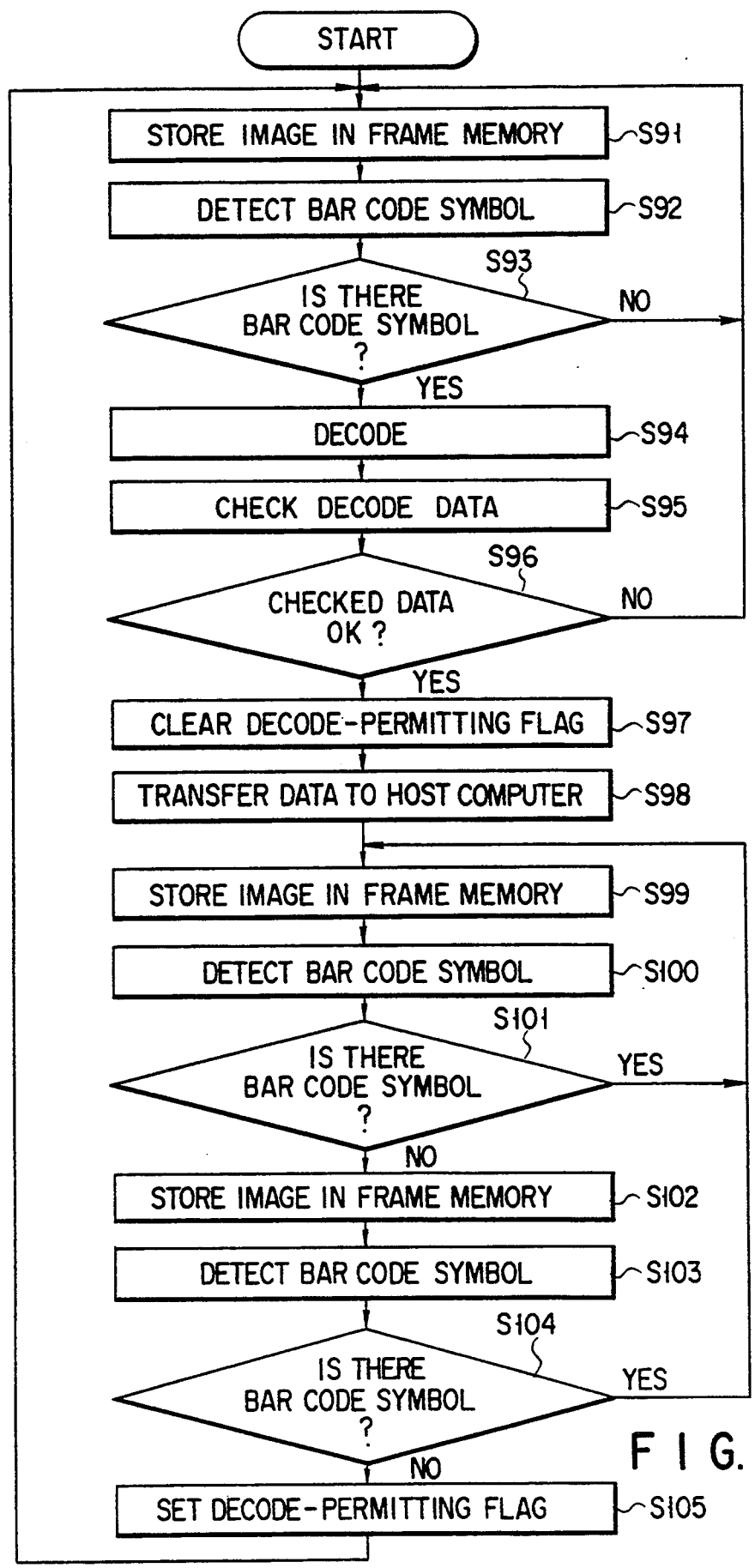
F I G. 14

BAR CODE SYMBOL READING APPARATUS WITH DOUBLE-READING PREVENTING FUNCTION

BACKGROUND OF THE INVENTION

1. Field of the Invention

This invention relates to a bar code symbol reading apparatus for reading bar code symbols, and particularly to an apparatus of this type having a double-reading preventing function. The word "double-reading" means an erroneous operation of reading (i.e., decoding) the content of a bar code symbol, then transferring the read data to a host computer or the like, thereafter again scanning and decoding the bar code symbol and transferring the decoded data to the host computer.

2. Description of the Related Art

With the spread of Point of Sales systems (POS), bar code symbols have been found everywhere. There are several tens of types of code systems, which include JAN/UPC/EAN code, ITF (Interleaved 2 of 5) code, CODE 39, NW-7 code, CODE 128, etc., as typical systems. These code symbols are referred to as one-dimensional bar code symbols, and each of them has a data capacity of about ten and several characters.

POS systems are broadly employed in department stores, supermarkets, etc., and bar code symbol reading apparatuses are used as the terminals of the POS systems. It is required to produce a bar code symbol reading apparatus which is cheap, easy to handle, and can perform accurate reading.

The bar code symbol is read basically in the following manner: A light beam is radiated from a light source onto the symbol to thereby scan the same, and then a light beam reflected therefrom is converged onto a light receiving element in the reading apparatus. Subsequently, the output signal of the light receiving element is decoded in an electric circuit comprising a microcomputer, etc., to thereby read the bar code symbol.

There are two types of bar code symbol reading apparatuses—a type of scanning symbols at all times and a type of scanning symbols when a reading switch or the like is operated. In the always scanning type, a "double-reading preventing" function for preventing twice reading of a single bar code symbol is considered especially important. In particular, registers used in supermarkets, etc., must have such a function. If an article with a bar code symbol is kept on a bar code reading apparatus even after the symbol is read, or if the article is removed from the apparatus too slowly, or if the article is moved on the apparatus here and there to read the symbol, a single bar code symbol may be read several times, and thus the number of articles which are bought actually may not correspond to that number of articles which is recorded in the host computer.

To avoid this, in the case of the conventional one-dimensional bar code symbol reading apparatus, two types of double-reading preventing methods have been proposed—one method for judging that a single bar code symbol has been read twice, when the decoded contents of two bar code symbols which have been read successively are identical to each other, and the latter symbol is canceled; the other method for inhibiting reading of the next bar code symbol until a predetermined time period elapses after the content of one symbol is transferred to the host computer.

Recently, the data capacity of the one-dimensional bar code system has been considered too small, and several types of code systems having a large data capacity, which are called "two-dimensional bar code systems", have been developed. One of them, called "data code", is a two-dimensional white/black square pattern, and specifically consists of an L-shaped outer frame, white and black outer frames arranged alternate, and data regions within the outer frames. However, a method for effectively preventing double-reading of such a two-dimensional bar code symbol has not yet been proposed.

If the aforementioned double-reading preventing method suitable for the one-dimensional bar code symbol reading apparatus is applied to the two-dimensional reading apparatus, lots of time is required to compare two-dimensional bar code symbols with each other since they have a data capacity much larger than one-dimensional bar code symbols. Further, decoding two-dimensional bar code symbols is very complicated, and therefore requires much time. Accordingly, the conventional method of comparing decoded data items is not suitable for the two-dimensional bar code symbol reading apparatus.

In addition, in the case of the method for inhibiting reading of the next bar code symbol until a predetermined time period elapses after one symbol is transferred to the host computer, it is very difficult to determine the predetermined time period. If the time period is long, it takes a long time until the next bar code symbol is read, whereas if it is short, a single bar code symbol may be read twice. Moreover, "double-reading" will be performed when the operator has left a sheet with a bar code symbol on the reading apparatus.

SUMMARY OF THE INVENTION

It is the object of the invention to provide a bar code symbol reading apparatus, in which double-reading is prevented by simple and speedy processing.

According to a first aspect of the invention, there is provided a bar code symbol reading apparatus comprising: scanning/storing means for scanning a bar code symbol at regular intervals, and storing image data corresponding to scanned symbols; position detecting means for detecting the position of the bar code symbol from the image data stored in the scanning/storing means; first position-storing means for storing a first position data indicating the position of the bar code symbol detected by the position detecting means; second position-storing means for storing a second position data indicating the position of the bar code symbol detected by the position detecting means prior to the first position data; comparing means for comparing the first position data stored in the first position-storing means with the second position data stored in the second position-storing means; and decoding means for decoding the bar code symbol on the basis of the image data stored in the scanning/storing means when it is determined by the comparing means that the first and second position data differ from each other.

According to a second aspect of the invention, there is provided a double-reading preventing device for use in a bar code symbol reading apparatus, comprising: position detecting means for detecting the position of a bar code symbol from image data obtained as a result of a picking up of the bar code symbol at regular intervals; first memory means for storing a first position data indicating the position of the bar code symbol detected by the position detecting means at a first time period;

second memory means for storing a second position data indicating the position of the bar code symbol detected by the position detecting means at a second time period prior to the first time period; comparing means for comparing the first position data stored in the first memory means with the second position data stored in the second memory means; and control means for generating a decode-permitting signal when the comparing means determines that the first and second position data differ from each other.

In the bar code symbol reading apparatus and double-reading preventing apparatus according to the first and second aspects, there are provided first and second memory means for storing the position of a bar code symbol, and comparing means for comparing position data stored in the first and second memory means. If the position of a bar code symbol having been decoded is identical to that of a bar code symbol newly read, the newly-read symbol is considered invalid, thereby preventing decoding of the same and hence avoiding double-reading.

According to a third aspect of the invention, there is provided a bar code symbol reading apparatus comprising: pick-up means for picking up a bar code symbol consisting of bars and spaces; bar code symbol detecting means for determining whether or not the bar code symbol exists, based on an output signal from the pick-up means; bar code symbol decoding means for interpreting the content of the bar code symbol from an image of the bar code symbol obtained by the pick-up means; and control means for permitting the bar code symbol decoding means to perform further operation, when the bar code symbol detecting means detects no bar code symbol at least one time after the bar code symbol decoding means decodes the bar code symbol.

In the bar code symbol reading apparatus according to the third aspect, further operation of the bar code symbol decoding means is inhibited unless the bar code symbol detecting means detects no bar code symbol at least one time after the bar code symbol decoding means decodes the bar code symbol. Thus, until it is confirmed that the bar code symbol has been removed from the reading apparatus, further symbol reading (decoding) is inhibited to prevent "double-reading".

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view, showing a direction in which scan is carried out to detect the four corners of a bar code symbol, and detected coordinates;

FIG. 5 is a view, showing the relation between two linear lines substantially perpendicular to each other, which are obtained from the detected coordinates, and the coordinates of the four corners;

FIG. 14 is a flowchart, useful in explaining the operation of the ninth embodiment.

DETAILED DESCRIPTION OF THE PREFERRED EMBODIMENTS

The embodiments of the invention will now be explained with reference to the accompanying drawings.

First Embodiment

Figure 1:
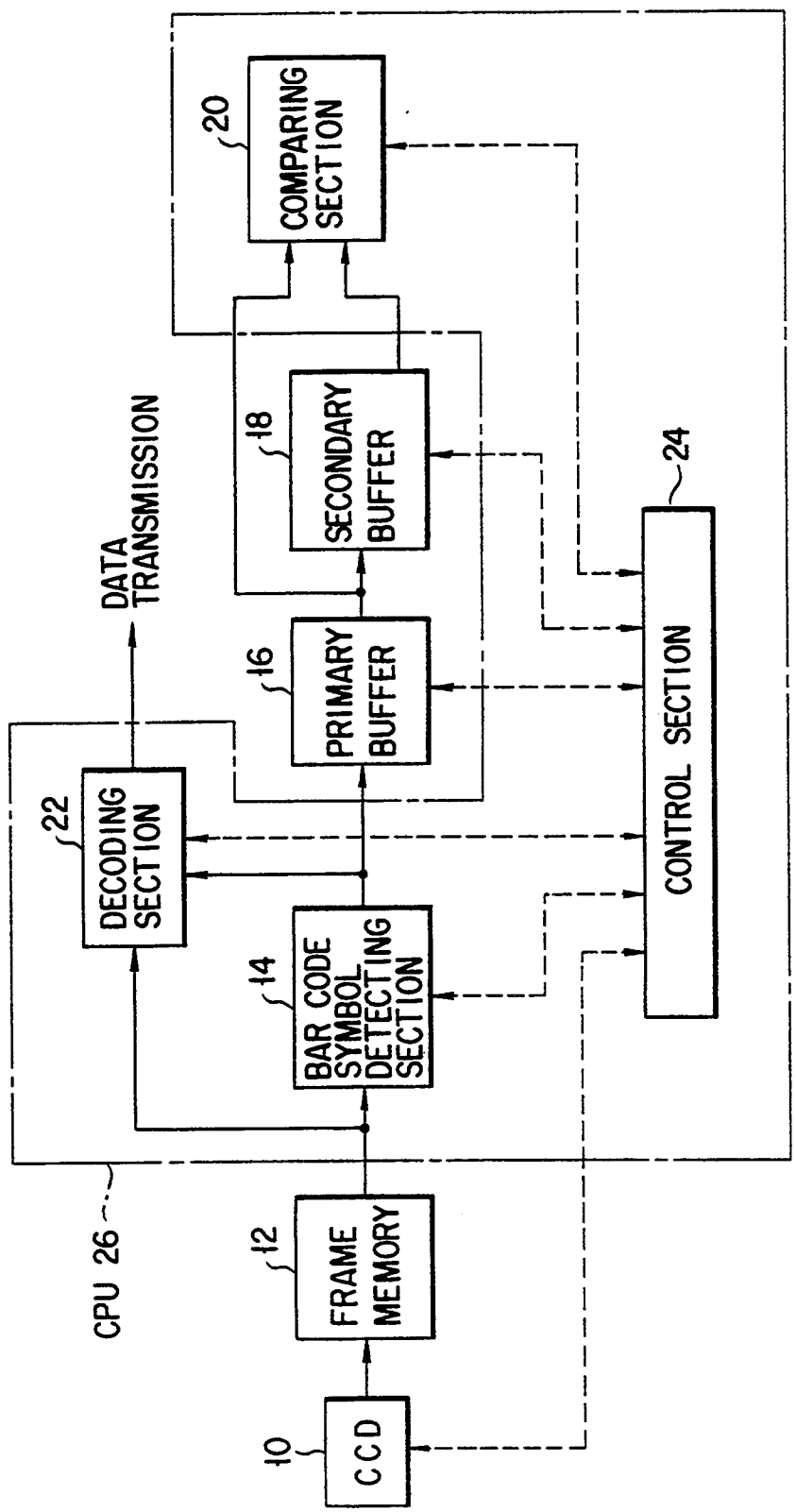
FIG. 1 is a block diagram, showing a first embodiment of the invention.

FIG. 1 is a block diagram showing a first embodiment of the invention. In FIG. 1, a CCD image sensor 10 scans that sheet, on which a bar code symbol is printed, attached to an article (not shown). Alternatively, the CCD image sensor 10 scans that the article itself on which a bar code symbol is printed. A frame memory 12 temporarily stores data indicative of the sheet or article obtained by the CCD image sensor 10.

A bar code symbol detecting section 14 detects bar code symbol from data items stored in the frame memory 12, and outputs symbol position data indicative of the position of the symbol. A primary buffer 16 successively stores symbol position data from the bar code symbol detecting section 14, and transmits the stored symbol position data to a secondary buffer 18 or a comparing section 20. The secondary buffer 18 stores the symbol position data from the primary buffer 16, and transmits the stored position data to the comparing section 20. The comparing section 20 compares the symbol position data from the primary buffer 16, with the other symbol position data from the secondary buffer 18.

A decoding section 22 reads bar code symbol data from data items stored in the frame memory 12 on the basis of the symbol position data of the bar code symbol detected by the detecting section 14, then decodes the content of the bar code symbol, and transmits the decoded data to a host computer (not shown).

A control section 24 controls the CCD image sensor 10, bar code symbol detecting section 14, primary and secondary buffers 16 and 18, comparing section 20, and decoding section 22.

The bar code symbol detecting section 14, comparing section 20, decoding section 22, and control section 24 can be included in a CPU 26.

Figure 2:
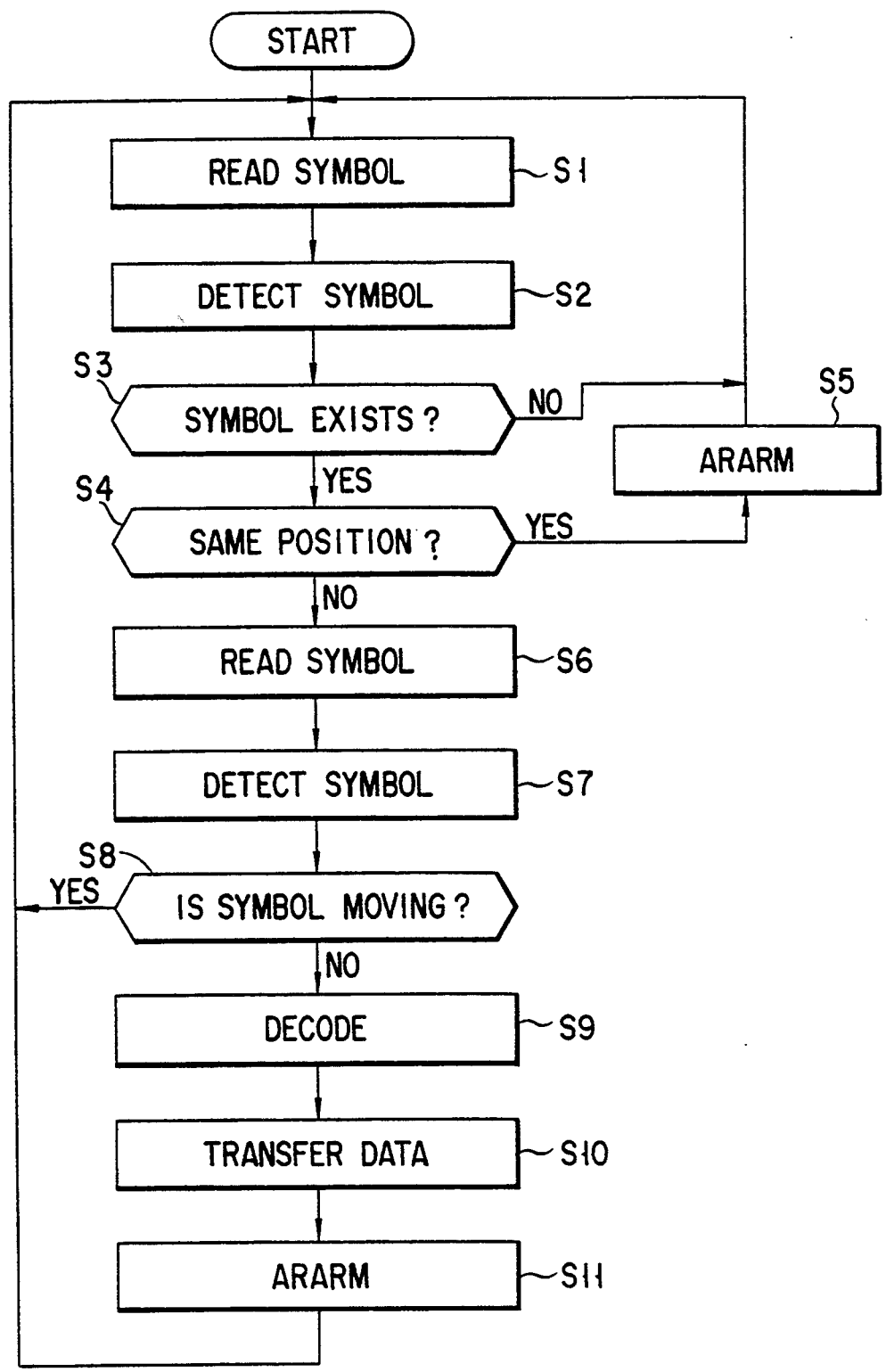
FIG. 2 is a flowchart, useful in explaining the operation of the first embodiment.

Processing of a bar code symbol performed in the apparatus constructed as above will be explained with reference to the flowchart of FIG. 2, using a known data code symbol as the bar code symbol.

Under the control of the control section 24, the CCD image sensor 10 senses the bar code symbol, and the frame memory 12 stores image data corresponding to the symbol (step S1). Subsequently, the bar code symbol detecting section 14 detects the symbol (step S2). In the case of using a data code symbol, since it has a characteristic pattern in its L-shaped outer frame, the coordinates of the four corners can be determined from the pattern. Therefore, it is determined in step S3 whether or not there is a bar code symbol, i.e., whether or not the coordinates of the four corners have been detected. If it is determined that there is no bar code symbol in a read image, the program returns to step S1.

Figure 3A:
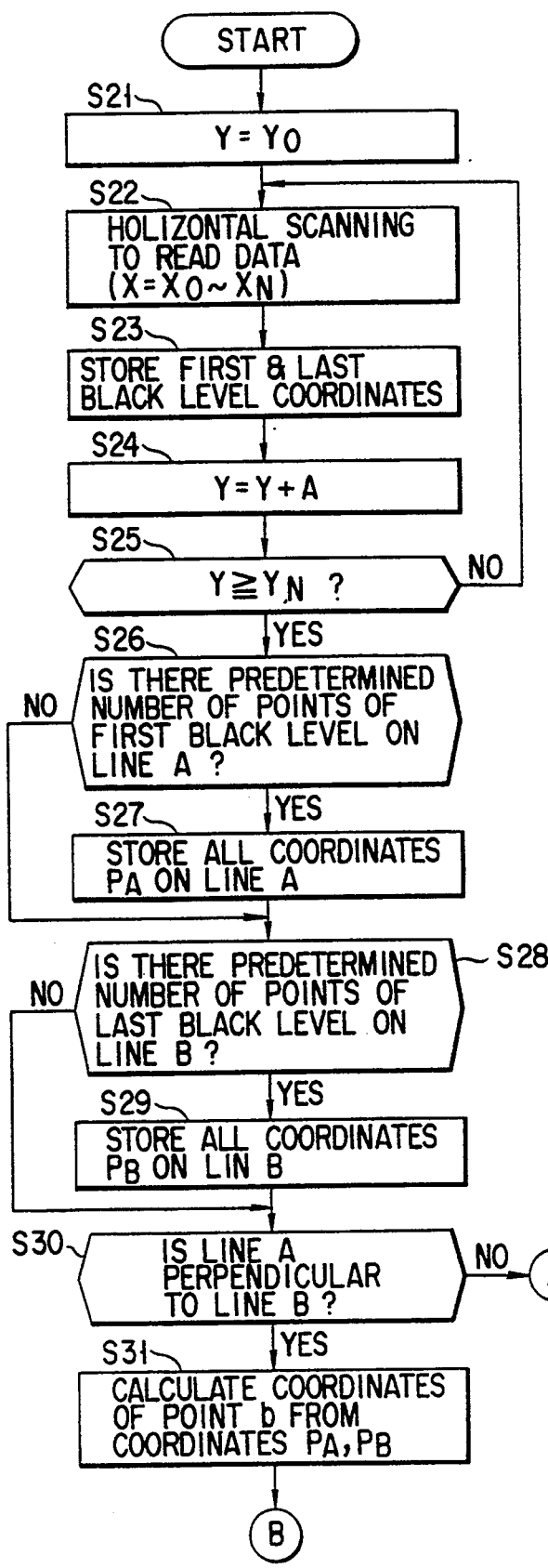
FIGS. 3A through 3C are flowcharts, useful in explaining in detail bar code symbol detection shown in FIG. 2.
Figure 3B:
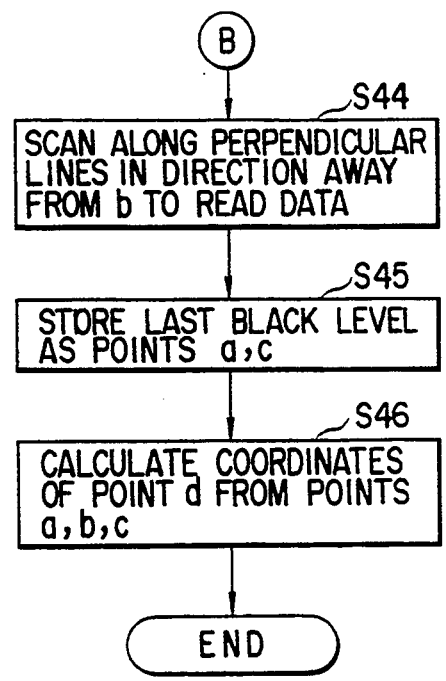
Figure 3C:
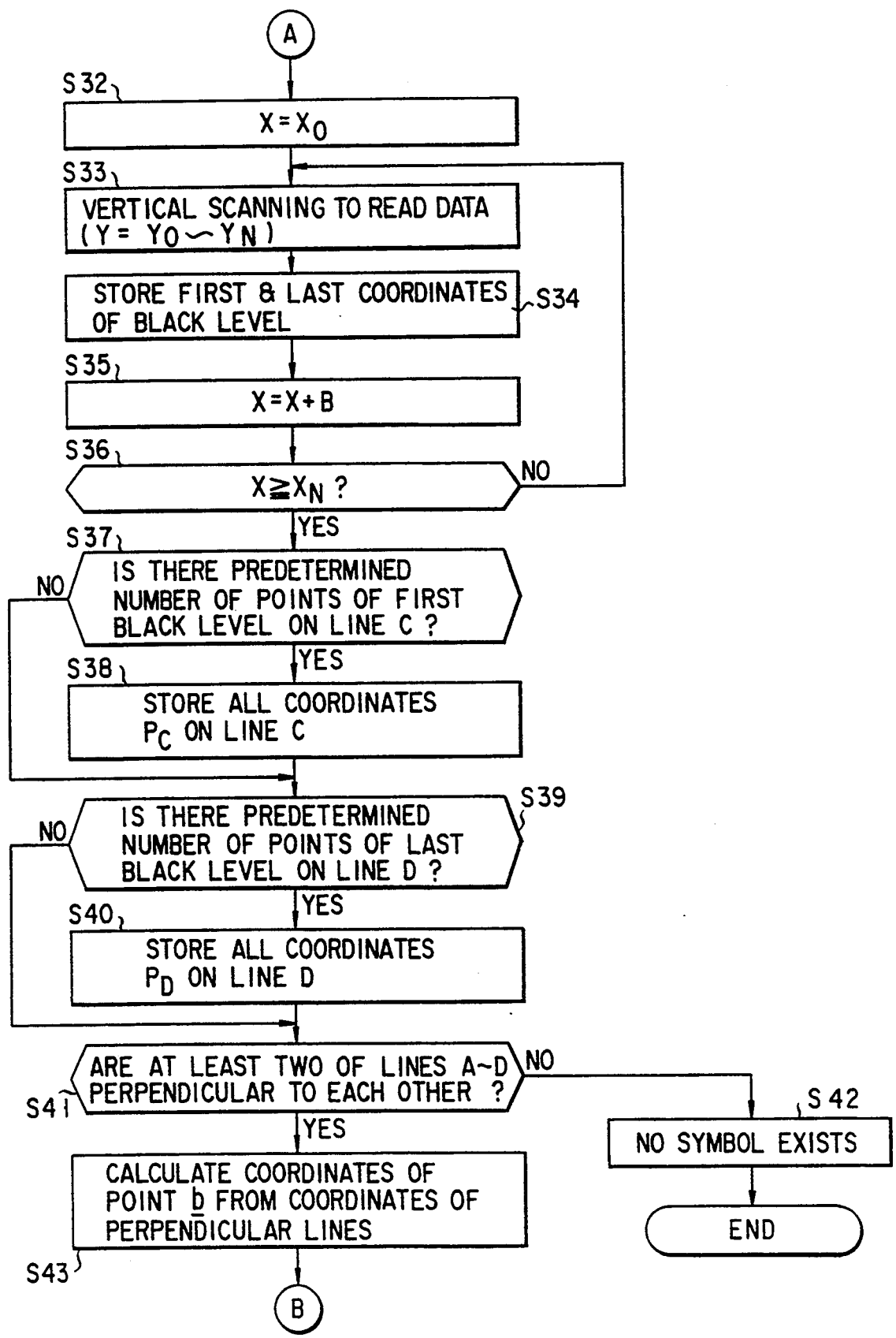

Detection and existence-judgement of the bar code symbol in steps S2 and S3 will be explained in more detail with reference to the flowcharts of FIGS. 3A to 3C.

As is shown in FIG. 4, the bar code symbol detecting section 14 scans the frame memory 12 every few pixels in the horizontal (x) direction. Specifically, the initial value of the Y-coordinate is set to $Y_0$ in step S21, and horizontal scanning is performed in step S22, with the X-coordinate varying every few pixels from an initial value of $X_0$ to a maximum value $X_N$. In step 23, the X- and Y-coordinates of the black level first detected during scanning and those of the black level last detected are stored. In step S24, the Y-coordinate is renewed by a predetermined value of A, and in step S25 it is determined whether or not the renewed Y-coordinate is higher than a maximum value $Y_N$. If it is not higher than the maximum value, the program returns to step 22 and the above-described processing is repeated.

After overall horizontal scanning is finished, a line A (e.g. $L_1$ in FIG. 5) connecting to one another a plurality (e.g. more than four) of points included in the first-detected black level is searched. If the line A is found in step S26, the coordinates $P_A$ of all the points on the line A are stored in step S27. Similarly, a line B connecting to one another a plurality (e.g. more than four) of points included in the last-detected black level is searched. If the line B is found in step S28, the coordinates $P_B$ of all the points on the line B are stored in step S29. Then, it is determined in step S30 whether or not the lines A and B are substantially perpendicular to each other. If they are perpendicular to each other, X- and Y-coordinates of an intersection point b (FIG. 5) of the lines A and B is calculated from the stored coordinates $P_A$ and $P_B$ in step S31.

If, on the other hand, it is determined in step S30 that the lines A and B are not perpendicular to each other (including a case where at least one of the lines A and B is not found), scanning is performed in the vertical (y) direction, and processing similar to the above is performed. Specifically, the initial value of the X-coordinate is set to $X_0$ in step S32, and vertical scanning is performed in step S33, with the Y-coordinate varying every few pixels from an initial value of $Y_0$ to a maximum value $Y_N$. In step 34, the coordinates of the black level first detected during scanning and those of the black level last detected are stored. In step S35, the X-coordinate is renewed by a predetermined value of B, and in step S36 it is determined whether or not the renewed X-coordinate is higher than a maximum value $X_N$. If it is not higher than the maximum value, the program proceeds to step S33 to thereby repeating the above-described processing.

After overall vertical scanning is finished, a C connecting to one another a plurality (e.g. more than four) of points included in the first-detected black level is searched. If the line C is found in step S37, the coordinates $P_C$ of all the points on the line C are stored in step S38. Similarly, a line D (e.g. $L_2$ in FIG. 5) connecting to one another a plurality (e.g. more than four) of points included in the last-detected black level is searched. If the line D is found in step S39, the coordinates $P_D$ of all the points on the line D are stored in step S40. Then, it is determined in step S4 whether or not there are two lines, which are substantially perpendicular to each other, between the lines A through D. If they are no lines perpendicular to each other, it is judged in step 42 that there is no bar code symbol, thereby terminating the processing an returning to step S1.

If there are two lines perpendicular to each other, an intersection point b (FIG. 5) of them is calculated from the stored coordinates in step S43.

Then, the coordinates of each of the four corners a, b, c, and d are determined from the calculated intersection point b and the coordinates of the detected points. Specifically, in step S44, scanning is performed along the perpendicular lines so as to move away from the intersection point b, thereby reading data. The last points of the last-detected black levels are stored as the points a and c, respectively, in step S45. The coordinates of the point d are calculated from the stored coordinates of the points a, b, and c, and the coordinates of the four points are supplied as symbol position data to the primary buffer 16 in step S46. The data code symbol has a square outline, and hence the positions of the four corners can be determined easily if the position of the intersection point b and the length of one side of the square can be determined. It does not matter that the coordinates of each of the four corners does not accurately correspond to the actual position of the symbol.

The thus-obtained coordinates of the four corners are temporarily stored in the primary buffer 16, which in turn transfers the stored symbol position data to the comparing section 20 and secondary buffer 18. The secondary buffer 18 transfers the stored symbol position data to the comparing section 20, and stores symbol position data from the primary buffer 16. The comparing section 20 compares the positions of at least two corresponding corners of the four corners respectively supplied from the primary and secondary buffers 16 and 18, and determines in step S4 whether or not the positions are identical to each other. At this time, they are considered identical when they are deviated from each other about only a few pixels. If the positions are identical to each other, it is determined that a single bar code symbol is read twice. Thus, in step S5, an alarm is generated to indicate that the double-reading preventing function has been effected, requesting that the code symbol (i.e., article) should be ignored and replaced with another. Thereafter, the program returns to step S1, where the next reading is carried out.

If it is determined in step S4 that the positions differs from each other, the position of the bar code symbol is confirmed (i.e., it is confirmed that the bar code symbol remains stationary), and the symbol is read again in step S6. In step S7, the bar code symbol detecting section 14 detects the position of the symbol as in step S2. New symbol position data is stored in the primary buffer 16, and compared, in the comparing section 20, with the symbol position data of the previous symbol stored in the secondary buffer 18 (step S8). At this time, the bar code symbol is confirmed when the positions are identical to each other.

When the static position of the bar code symbol is confirmed, i.e., it is confirmed that the symbol remains stationary, the program proceeds to the next step S9, where the control section 24 supplies a decode-allowing signal to the decoding section 22, and the decoding section 22 decodes the bar code symbol. That is, the decoding section 22 sequentially scans only that part of the frame memory 12 in which the bar code symbol exists, along the symbol as shown in FIG. 5 by use of the symbol position data supplied from the bar code symbol detecting section 14. Thus, the symbol is decoded. Thereafter, the decode result is transferred to a host computer (not shown) in step S10, and an alarm indicating that reading of one bar code symbol is completed is generated in step S11, thereby terminating the processing. The program returns to step S1 to read the next bar code symbol.

As is described above, in the first embodiment, immediately after a new bar code symbol is sensed by the CCD image sensor 10, the symbol is sensed again, and decoding is started if it is determined that the symbol remains stationary. The loop of steps S1 to S5 is repeated until the decoded symbol is replaced with a new one, thereby preventing double-reading.

If an image of the decoded symbol is erroneously picked up while the symbol is moved to be removed, the program skips from step S4 to step S6. However, the program must return to step S1 since the answer to the question of step S8 as to confirm the stationary state of the symbol is "Yes". Thus, double-decoding, i.e., double-reading, can be prevented.

Further, while the next bar code symbol is moved to be placed on the reading apparatus, the answer to the question of step S8 is Yes, too, and hence decoding of the symbol is not started until it stops moving.

In this case, however, even though it is determined in step S8 that the symbol, which is read in step S6, is moving, if the symbol stops moving before it is read again in step S1, it is determined in step S4 that the present position is identical to the previous position. Accordingly, the program cannot proceed to step S6 et seq., which means that the symbol cannot be decoded. At this time, however, an alarm is generated in step S5. indicating that the operator must move the symbol to cause the same to be read.

As described above, in the first embodiment, only symbol position data items of bar code symbols are compared with each other, and hence the comparison can be performed in a simple manner at a high speed. Moreover, since the bar code symbol is decoded after its position is confirmed, double-reading can be prevented while a bar code symbol is replaced with a new one.

Second Embodiment

Although in the first embodiment, a data code is used as the bar code symbol, the invention is not limited to this, but may be modified so that a two-dimensional bar code symbol such as PDF417, CODE49, etc. is used as the symbol.

Figure 6:
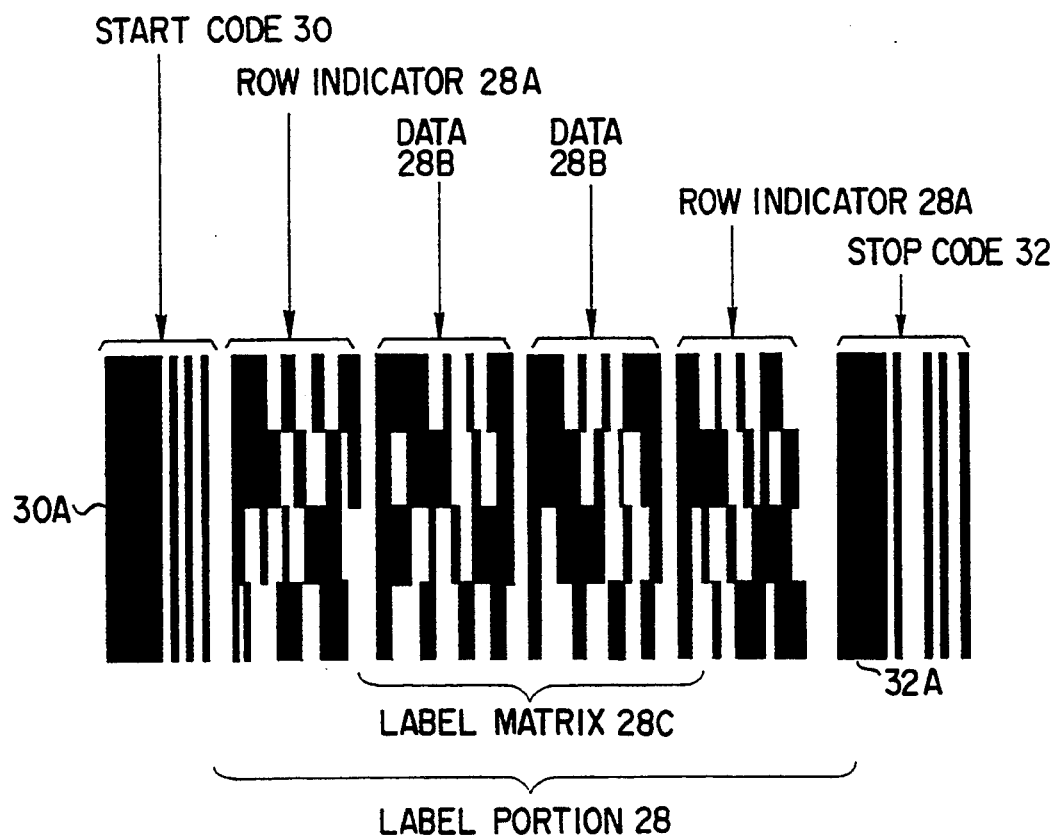
FIG. 6 is a view, showing the structure of PDF417, an example of a two-dimensional bar code symbol.

A second embodiment in which PDF417 is used will be explained. The structure of the PDF417 is shown in FIG. 6. Specifically, this bar code symbol has a label portion 28 containing a data component to be decoded and including bar code character groups (combinations of bars and spaces), a start code 30 which is a start character provided at the start end of the symbol, and a stop code 32 which is a stop character provided at the stop end. Each code, except the stop code 32, consists of four bars and four spaces, and the stop code consists of five bars and four spaces. The start and stop codes 30 and 32 start with thick bars 30A and 32A called "BIG BAR"s, respectively. The coordinates of the four corners of the symbol can be determined by detecting these distinctive big bars 30A and 32A.

The label portion 28 has row indicators 28A provided adjacent to the start and stop codes 30 and 32, respectively, and a label matrix 28C consisting of a plurality of data columns 28B. The row indicator 28A indicates the row-directional size of the label, the column-directional size of the same, and the security level of the same. The security level means the level of the error-correction capacity of the PDF417, and has nine degrees. Therefore, the data amount, etc., of a bar code symbol can be measured by decoding the data of the row indicator 28A.

FIG. 6 shows a bar code symbol having a label matrix of a size of 4×2.

Figure 7:
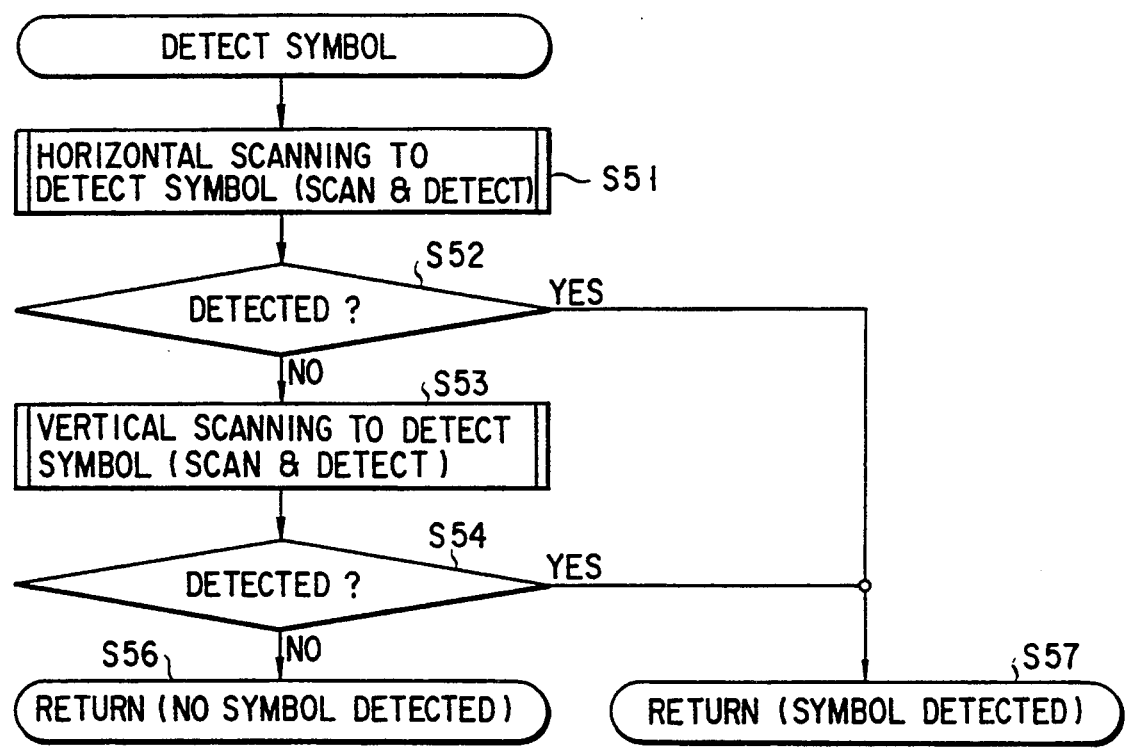
FIG. 7 is a flowchart, useful in explaining detection of a bar code symbol, according to a second embodiment.

The second embodiment differs from the first embodiment only in the process of detection of a bar code symbol (see step S2 in FIG. 2), and therefore only this process will be explained with reference to FIG. 7. Note that all the flowcharts used in this application are written in accordance with the descriptions used in the C programming language.

Figure 8:
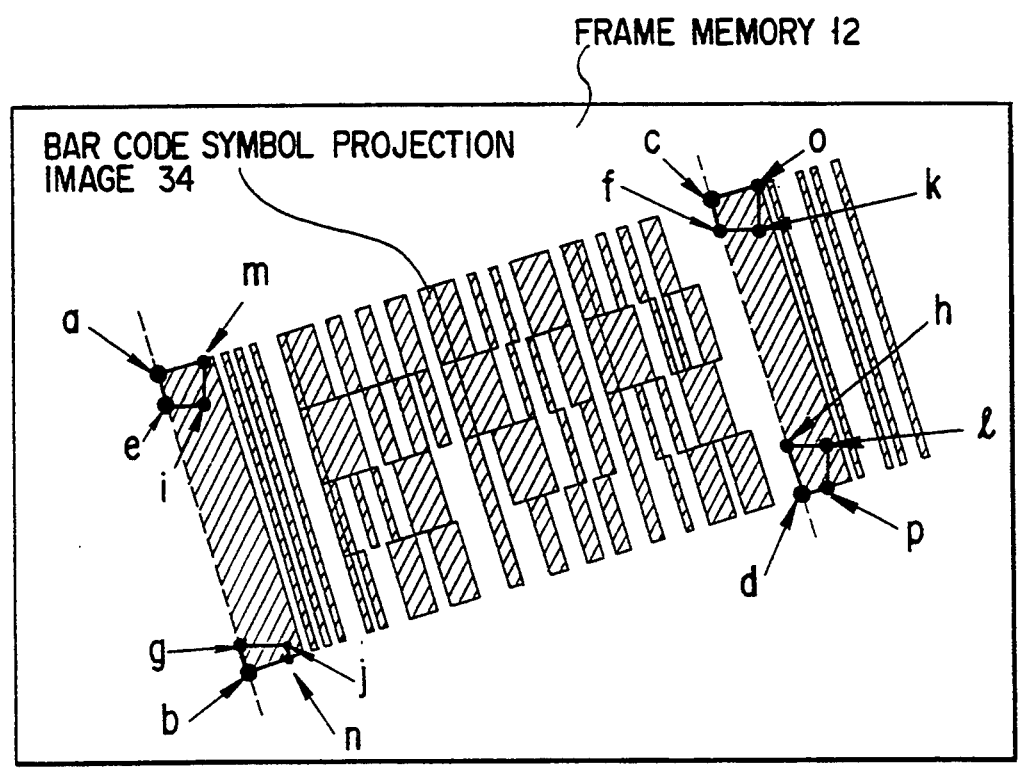
FIG. 8 is a view, showing a bar code symbol image obtained by imaginarily projecting PDF417, having (4×1) label matrix, on a pixel array of a frame memory.

FIG. 8 is a view, showing a bar code symbol image obtained by imaginarily projecting PDF417, having (4×1) label matrix, on a pixel array of the frame memory 12. The bar code symbol detecting section 14 detects a projected image 34 on the frame memory 12. Specifically, in step S51, the detecting section 14 scans the frame memory 12 every few pixels in the horizontal (x) direction, to thereby detect the start and stop codes 30 and 32 and determine the four corners of the bar code symbol 34. If it is determined in step S52 that no symbol is found in the horizontal direction, then the frame memory 12 is scanned in the vertical (y) direction to find the four corners of the symbol 34 (step S53). If it is determined in step S54 that no symbol is found in the vertical direction, too, the program is terminated and returns to the beginning, indicating that no symbol exists in the frame memory 12. It should be noted that the flowchart is written as shown in FIG. 7 so as to accord with the descriptions used in the C programming language. However, it would be modified such that the program returned to the beginning after a flag indicative of no symbol was set, if it were written in accordance with the descriptions used in the FORTRAN language. If the four corners of a bar code symbol are found in step 52 or 54, the program is terminated, indicating the existence of the symbol.

Figure 9B:
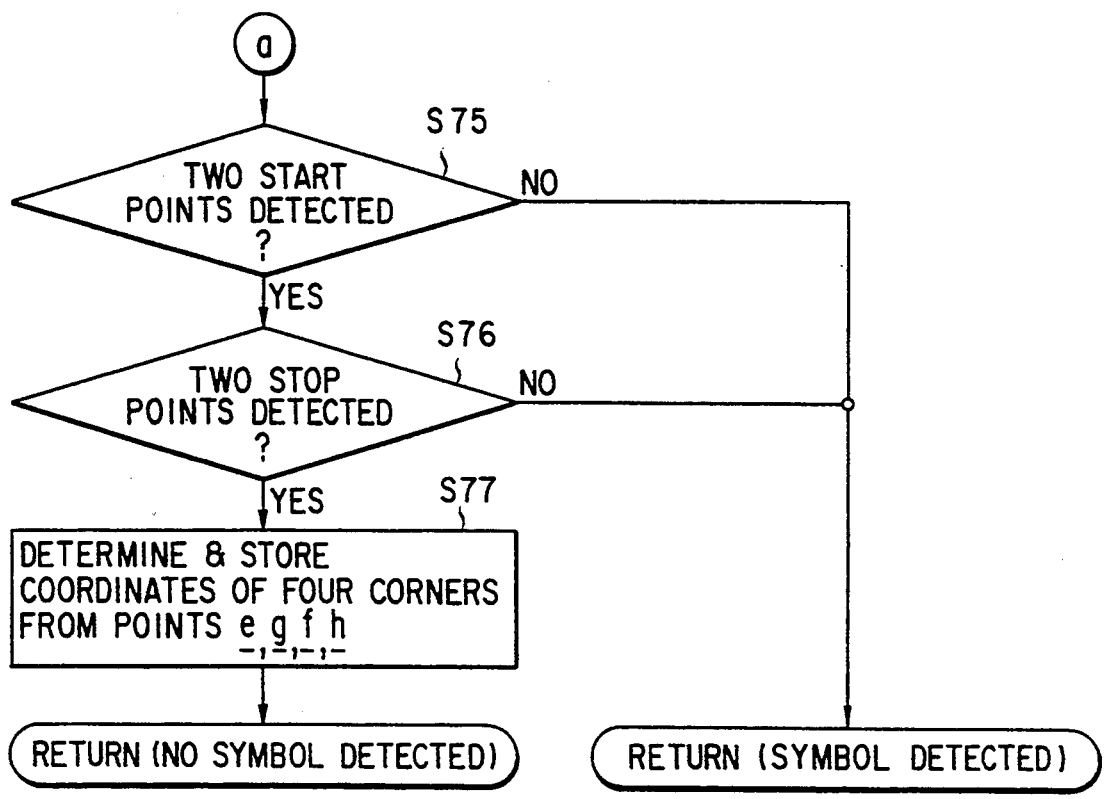
FIGS. 9A and 9B are flowcharts, useful in explaining scan & detection subroutine shown in FIG. 7.
Figure 9A:
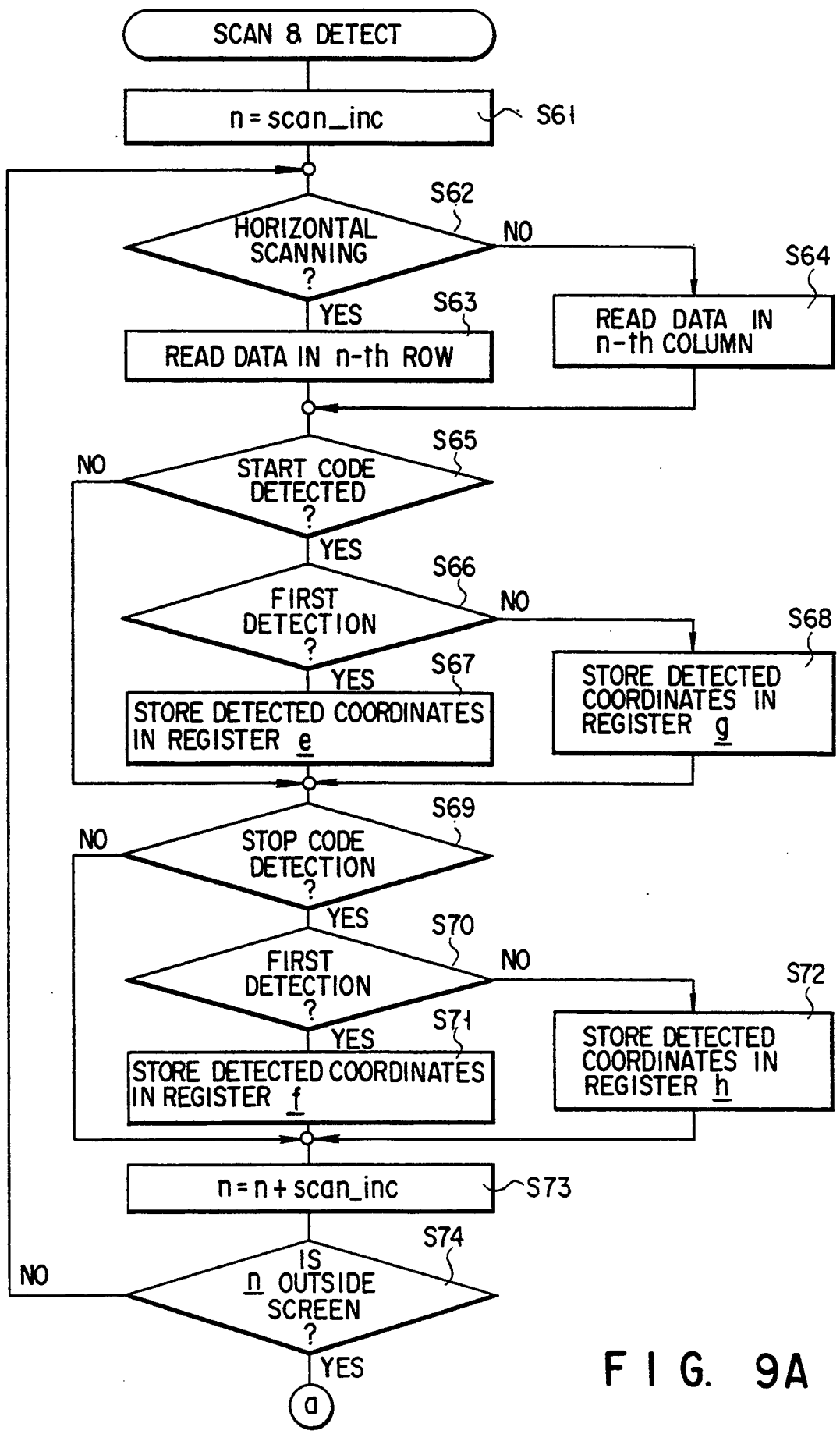

The detection routine performed in steps S51 and 53 will be explained in detail with reference to FIGS. 9A and 9B.

First, in step S61, to scan the frame memory 12 every few pixels, the value n of a reading position counter is initially set to a value of scan-inc, which is a predetermined increment corresponding to the above few pixels.

Then, it is determined in step S62 whether horizontal scanning or vertical scanning is being performed. If it is determined that horizontal scanning is being performed, a data row is read from the n-th row of the frame memory 12 in step S63. If, on the other hand, it is determined that vertical scanning is being performed, a data row is read from the n-th column of the frame memory 12 in step S64.

Thereafter, it is determined in step S65 whether or not the start code 30 exists in the read data row. If the code 30 exists, it is determined in step S66 whether or not the code 30 has been detected for the first time in the present image data. If so, the detected coordinates are registered in a coordinate variable register e in step S67, whereas if not so, they are registered in a coordinate variable register g in step S68.

Then, similarly, it is determined in step S69 whether or not the stop code 32 exists. If the code exists, it is determined in step S70 whether or not the code 32 has been detected for the first time. If the detected coordinates are registered in a coordinate variable register f in step S71, whereas if not so, they are registered in a coordinate variable register h in step S72.

Then, in step S73, the value n of the reading position counter is added by the above increment of scan-inc, thereby setting the next scanning position, and in step S74, it is determined whether or not the set position is inside the screen of the frame memory 12. If it is inside the screen, the program returns to the step S62, thereby reading the next data row.

If the set position is outside the screen, it is determined in steps S75 and S76 whether or not two start codes and two stop codes have been found, respectively. That is, it is determined whether or not all the values stored in the coordinate variable registers e, g, f, and h are determined. If they are not all determined, it is judged that no bar code symbol is found, and the next symbol is read.

If all the values of the coordinate variable registers are determined, the coordinates of the four corners of the symbol are calculated and stored in step S77. Specifically, first, a straight line passing points e and g is obtained. Then, the symbol data items are observed toward the upper and lower edges of the symbol from points i and j located few pixels inside the points e and h in the big bar, respectively. The coordinates of edge points each first found are registered in coordinate variable registers m and n, respectively. vertical lines are drawn from points m and n to the straight line passing the points e and g. Intersections a and b between the straight line and the vertical lines are defined as two corners of the symbol on the start code side. Similarly, two corners c and d on the stop code side are obtained.

Though the points c and d do not accurately correspond to the actual two corners of the symbol, this will not cause no problem, and hence they are used as the two corners of the symbol for simplifying calculation. It is a matter of course that the actual two corners can be determined by searching data items from the points c and d along the vertical lines, since the stop code 32 has a given code pattern.

The coordinates of the thus-obtained four corners a, b, c, and d are supplied as symbol position data items to the primary buffer 16, and then compared with the symbol position data items stored in the secondary buffer 18 to thereby prevent double-reading of the bar code symbol.

Third Embodiment

Though in the first and second embodiments, second time reading of the bar code symbol is performed in step S6 immediately after the first-time reading, it may be performed one or two seconds later. In this case, it can be confirmed that the bar code symbol has been set properly, and hence more accurate reading can be performed.

Fourth Embodiment

The bar code symbol position comparison in step S8 can be omitted by performing bar code symbol reading in step S6 one or two seconds after the first-time reading, as in the third embodiment. In this case, more speedy processing can be performed.

Fifth Embodiment

Though in the first and second embodiments, the program proceeds to step S1 to perform bar code symbol reading immediately after an alarm is generated in step S11, steps S6 to S8 can be omitted, i.e., more speedy processing can be performed, if the processing of step S1 is performed after a time period sufficient to change bar code symbols, e.g., two or three seconds, elapses. Similarly, the third and fourth embodiments may be modified such that a time period sufficient to change bar code symbols is provided before the program returns from step S11 to step S1.

Moreover, it is also preferable to provide a time period sufficient to change bar code symbols before the program returns from step S5 to step S1.

Sixth Embodiment

The bar code symbol position data may contain the coordinates of at least one of the four corners of a symbol.

Seventh Embodiment

Though in the first through sixth embodiments, the CCD image sensor 10 and frame memory 12 are used in combination, a random-accessible CMD (Charge Modulation Device) may be used as a scanning device in place of them. Since the CMD has a frame memory function, no frame memory is necessary.

Eighth Embodiment

A system according to an eighth embodiment of the invention will be explained, which can read a two-dimensional bar code symbol put on an article transferred on a belt conveyer.

Figure 10:
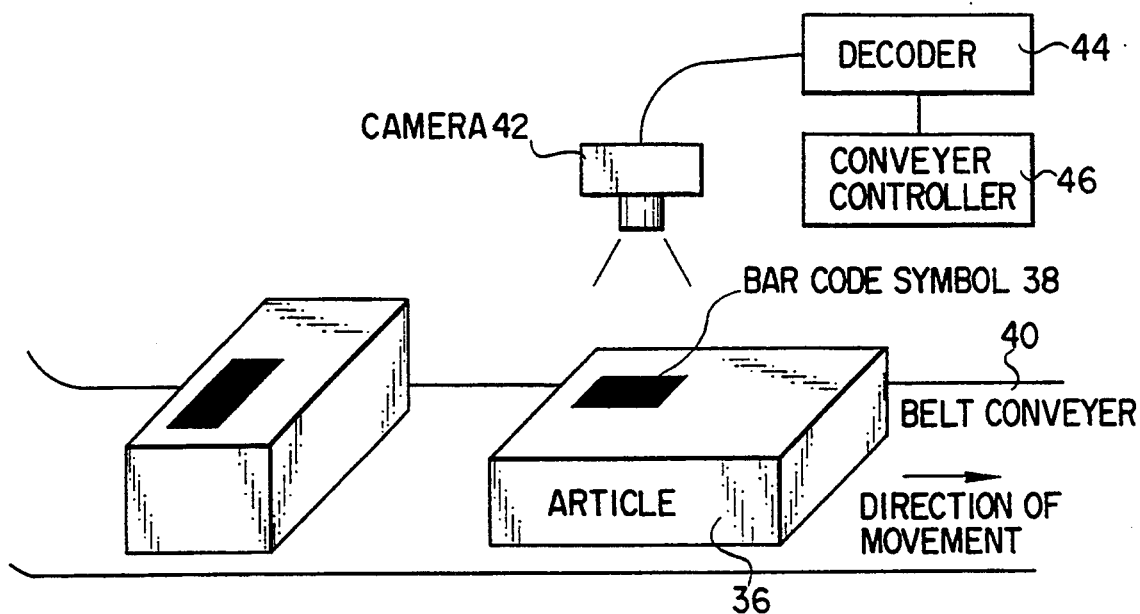
FIG. 10 is a view, showing an eighth embodiment of the invention.

FIG. 10 shows the system of the eighth embodiment. Each article 36 has a label of a two-dimensional bar code symbol 38 attached thereon. The symbol contains coded data items indicative of the name, destination and numerical quantity, etc., of the article. The article 36 is moved by a belt conveyer 40 at a predetermined constant speed in a predetermined direction, and the bar code symbol 38 is scanned when it passes under a camera 42 placed in a predetermined position. The camera 42 continuously picks up. It is considered that the picked up image is free from blurring due to movement of the article, since the camera employs high-speed strobe shutter. The image of the bar code symbol picked by the camera 42 is decoded by a decoder 44, and the flow of the article 36 is controlled by a conveyer controller 46 in accordance with the decoded data.

The decoder 44 has the same structure as a corresponding element employed in the first embodiment except that different processing is performed in the comparing section 20.

Figure 11:
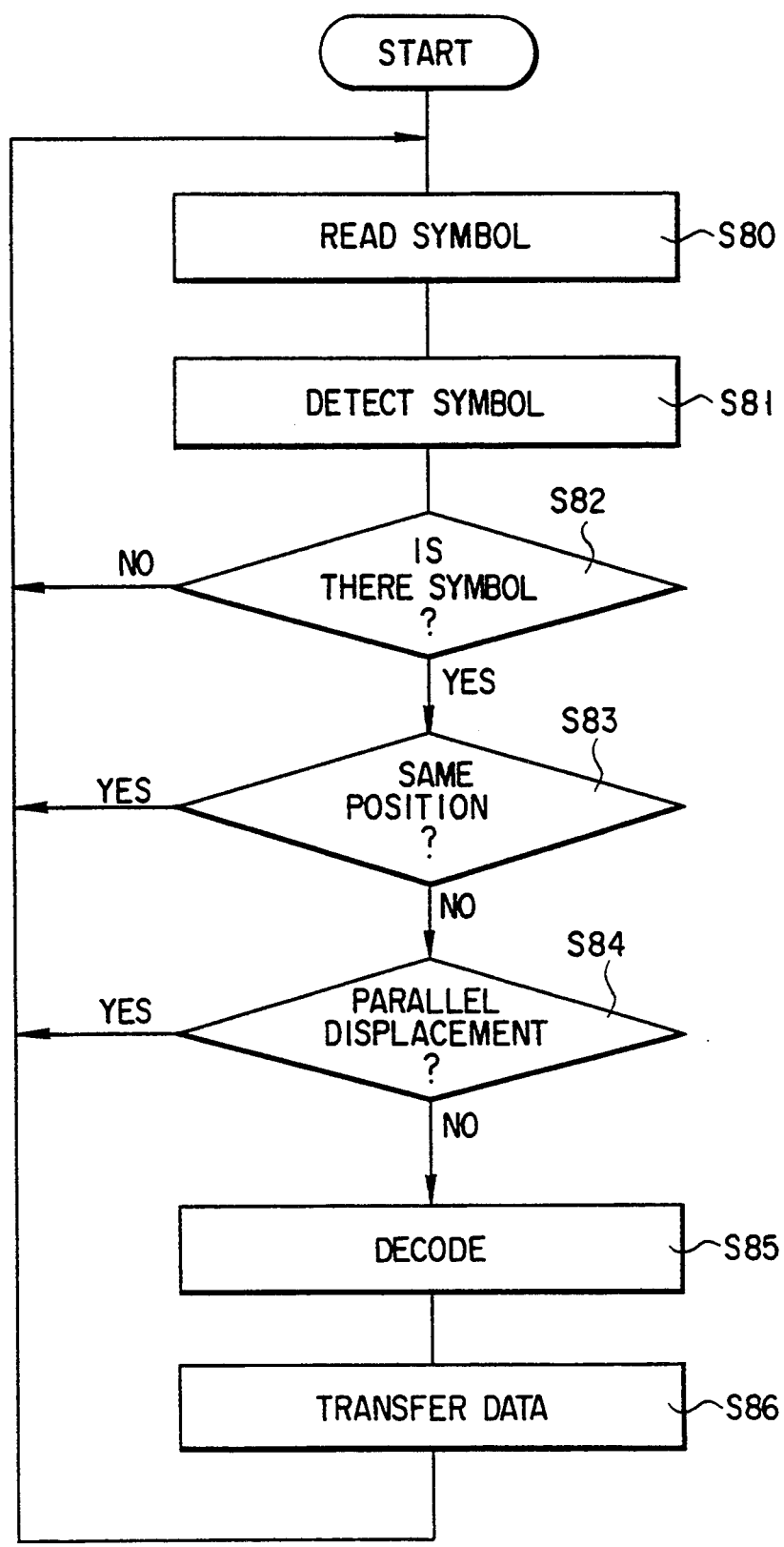
FIG. 11 is a flowchart, useful in explaining the operation of the eighth embodiment.

The manner of decoding PDF417 as the two-dimensional bar code symbol will be explained in detail with reference to the flowchart of FIG. 11.

In step S80, the camera 42 repeatedly picks up, and stores image data indicative of the picked up image in the frame memory 12. In step S81, the bar code symbol detecting section 14 reads data from the frame memory 12, and detects the coordinates of the four corners of the symbol by the above-described symbol detecting method. In step S82, it is determined whether or not the coordinates of the four corners have been detected, i.e., whether or not the symbol exists inside the screen of the frame memory. If the symbol does not exist, the program returns to step S80, where next image is read.

If the symbol exists, the detected four corner coordinates are stored as symbol position data in the primary buffer 16, and then supplied to the comparing section 20, where the symbol position data is compared with the previous symbol position data stored in the secondary buffer 18. The comparing section 20 compares, in step S83, the coordinates of the four corners to determine whether the present symbol position is identical to the previous one. If they are identical to each other, it is determined that a single bar code symbol has been read twice, and the presently-read symbol is ignored and not decoded. Thus, the program returns to the step S80, where the next image is read.

Figure 12:
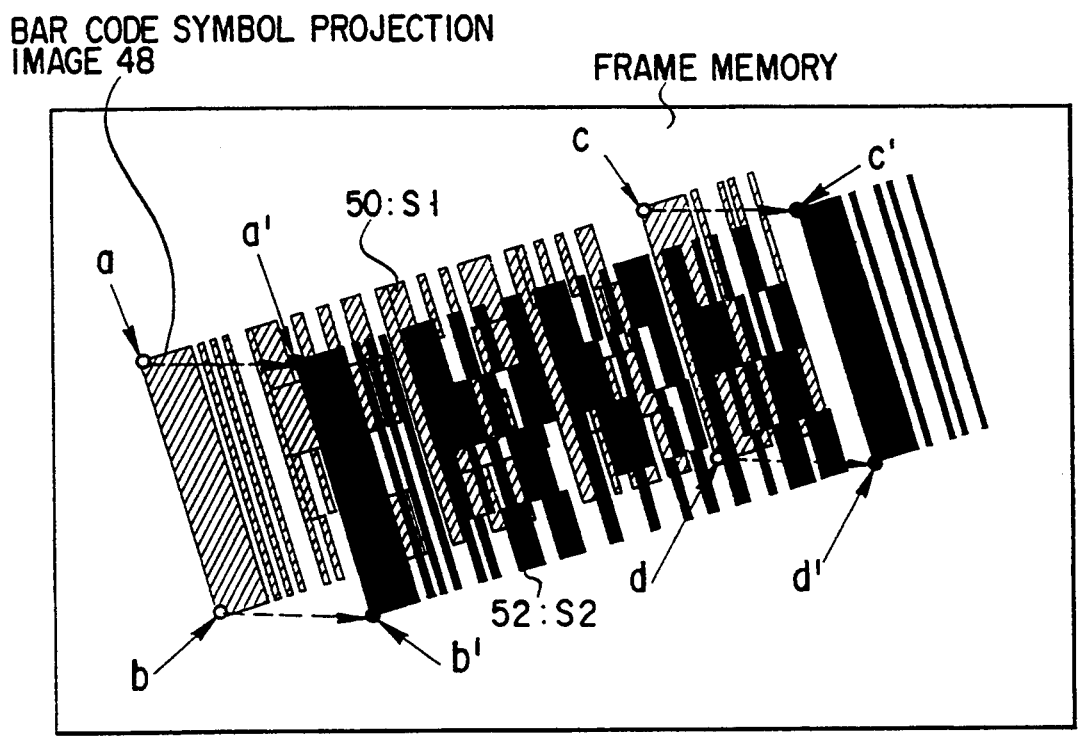
FIG. 12 is a view, useful in explaining parallel movement of a bar code symbol.

If, on the other hand, the present symbol position data differs from the previous symbol position data, it should be considered that the bar code symbol 38 is moved at a predetermined speed in a predetermined direction since it is moved on the belt conveyer 40. FIG. 12 shows a bar code symbol image 48 projected on the frame memory. In FIG. 12, reference numeral 50 designates a symbol image S1 previously picked up, reference numeral 52 a symbol image S2 presently picked up, reference signs a, b, c, and d the detected four corners of the symbol S1, and a', b', c', and d' the detected four corners of the symbol S2. The bar code symbol 38, moving on the belt conveyer 40, first reads the symbol S1, and then reads the symbol S2 which has been displaced from the symbol S1 in parallel therewith in accordance with movement of the conveyer 40. As is shown in FIG. 12, if the symbol S1 is parallel with the symbol S2 and separated therefrom by a distance corresponding to the distance through which the belt conveyer 40 moves, it can be determined that a single bar code symbol is read twice. This means that when the camera 42 picks up symbols at small intervals, a single symbol can be read twice in many cases.

To avoid this, in the eighth embodiment, it is determined in step S84 whether or not the symbols S1 and S2 are completely parallel with each other. If so, is determined that a single bar code symbol is read twice, and the program returns to step S80, where the next symbol is read. On the other hand, if not so, is determined that a new symbol has been read, and the new symbol is decoded by the decoding section 22 in step S85. The decoded data is transferred to the conveyer controller 46 in step S86. At this time, the symbol position data of the decoded symbol is output from the primary buffer 16 to the secondary buffer 18. Then, the program returns to step S80, and next reading is performed.

As described above, double-reading of a bar code symbol which is moving in a given direction also can be prevented by determining whether or not parallel movement has been carried out, in addition to comparison between the coordinate positions of the four corners of two symbols.

Ninth Embodiment

Then, a ninth embodiment according to the invention will be explained with reference to FIG. 13.

Figure 13:
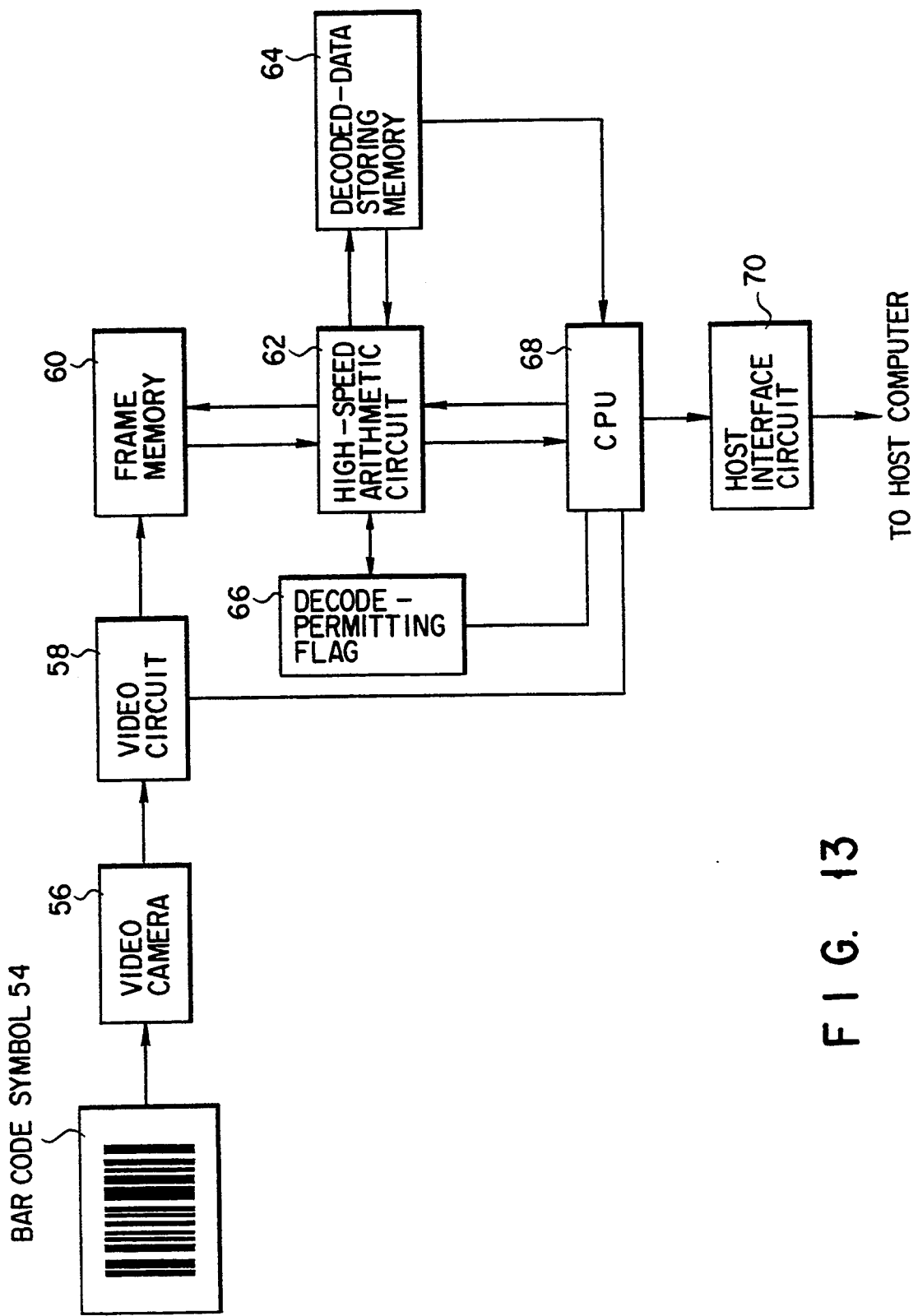
FIG. 13 is a block diagram, showing a ninth embodiment of the invention.

As is shown in FIG. 13, a sheet with a bar code symbol 54 is illuminated by an illumination device (not shown), and a light beam reflected from the sheet is radiated onto a video camera 56. In the camera 56, a light signal is converted to an electric signal, and then converted to a video signal by adding a synchronization signal thereto. The video signal is supplied to a video circuit 50, where the synchronization signal is separated from the video signal, and then digitized by A/D conversion. The digitized signal is stored in a frame memory 60.

An image of the sheet with the bar code symbol 54 stored in the memory 60 is scanned by use of a high-speed arithmetic circuit 62 (image data is detected in the memory 60), and determination as to whether or not the symbol 54 exists and decoding of the symbol are performed. The decoded data is temporarily stored in a decoded-data storing memory 64. When decoding of the symbol is completed, the high-speed arithmetic circuit 62 clears a decode-permitting flag 66 (i.e., decoding is inhibited).

A CPU 68 controls the overall system. For example, it supplies the video circuit 58 with an image-reading start signal for instructing the same to store image data in the frame memory 60, and the high-speed arithmetic circuit 62 with a symbol detection start signal and a symbol decoding start signal. Further, the CPU 68 controls the overall system, upon receiving from the circuit 62 a signal indicative of a detected state of the symbol 54 and a signal indicating that decoding and checking of the symbol 54 has been completed. In addition, when the symbol 54 is detected, the CPU 68 sets the decode-permitting flag 66 indicating that decoding should be performed, thereby reading data on the symbol 54 from the decoded-data storing memory 64, controlling a host interface circuit 70 to transfer the read data to a host computer (not shown).

The "Double-Reading" preventing mechanism employed in the bar code symbol reading apparatus constructed as above will now be explained with reference to the flowchart of FIG. 14.

First, in step S91, the CPU 68 supplies the video circuit 58 with an image-reading start signal for instructing the same to store image data in the frame memory 60. In step S92, it supplies the high-speed arithmetic circuit 62 with a symbol detection start signal, thereby causing the same to detect the symbol 54. There are various known methods for detecting the symbol 54 as well as the above-described methods. For example, Published Unexamined Japanese Patent Application No. 2-23483 discloses a symbol detection method, in which it is determined that a bar code symbol exists, when a plurality of parallel bars are confirmed. Further, there is a method for detecting a two-dimensional bar code symbol (e.g. PDF417 or DATA CODE) by confirming a characteristic portion such as a start big bar or an L-shaped outer frame. The high-speed arithmetic circuit 62 supplies the CPU 68 with detected data on the symbol 54 to be used as the detected-state signal.

In step S93, the CPU 68 examines the detected state signal from the circuit 62 to determine whether or not symbol data is contained in the image data in the frame memory 60. If no symbol is found, the program returns to step S91, and next storing is instructed. On the other hand, if the symbol 54 has been found, the CPU 68 supplies the high-speed arithmetic circuit 62 with a decode start signal to cause the same to decode the symbol 54 (step S94). Upon receiving the decode start signal, the circuit 62 decodes the image data on the symbol 54 stored in the frame memory 60 after it confirms that the decode-permitting flag 66 is set. Moreover, the circuit 62 checks the decoded data in step S95. In the case of using JAN/UPC/EAN codes, ITF (Interleaved 2 of 5) code, CODE39, NW-7 code, CODE128, etc., the decoded data is only confirmed, while in the case of using PDF17, DATA CODE, etc., error correction is included in the contents of checking. The high-speed arithmetic circuit 62 supplies the CPU 68 with a decode/check end signal containing checking results.

The CPU 68 judges the decode/check end signal from the circuit 62 in step S96, and causes the program to return to step S91 if correct decoding is not performed, thereby performing next scanning. If, on the other hand, it is determined that correct decoding has been performed, the CPU 68 supplies a decoded-data keeping signal to the circuit 62, which, in turn, temporarily stores the decoded data in the decoded-data storing memory 64 and clears the decode-permitting flag 66 to inhibit further decoding (step S97).

Then, in step S98, the CPU 68 reads the data on the symbol 54 stored in the decoded-data storing memory 64, thereby controlling the host interface circuit 70 to transfer the read data to a host computer (not shown).

In step S99 et seq., "Double-Reading" preventing processing is performed.

In step S99, the CPU 68 again supplies the video circuit 58 with an image-reading start signal for instructing the same to store an image in the frame memory 60, and then in step S100, it causes the arithmetic circuit 62 to detect the bar code symbol 54. If data on the symbol 54 is contained in the image data stored in the frame memory 60, it is confirmed that the decode-permitting flag 66 is cleared (step S101), and the program returns to step S99. That is, if the symbol 54 remains even after data transfer to the host computer is completed, it is Judged that the symbol should be removed from the reading apparatus, and program proceeding to step S102 et seq. is inhibited.

If it is determined in step S101 that no symbol 54 exists, the CPU 68 supplies the video circuit 58 with an image-reading start signal for instructing the same store an image in the frame memory 60 (step S102), and then it causes the arithmetic circuit 62 to detect the bar code symbol 54 (step S103). If data on the symbol 54 is contained in the image data stored in the frame memory 60, it is confirmed in step S104 that the decode-permitting flag 66 is cleared, and the program returns to step S99. That is, in steps S101 to S104, processing similar to that of steps S99 to S101 is performed.

If it is determined in step S104 that no symbol 54 is found, the CPU 68 sets the decode-permitting flag 66 in step S105. This means that the flag 66 is set when no symbol data is found in the image data stored in the frame memory 60 even after symbol detection is performed two consecutive times. Thereafter, the program returns to step S91, where the above-described processing is repeated.

As is explained above, in the ninth embodiment, the "Double-Reading" is prevented only on the basis of detection of a symbol, so that the processing can be performed at high speed. That is, in the embodiment, less time is required to effect the double-reading preventing function than in the conventional apparatus, since in the conventional apparatus, the time required to complete decoding of a symbol is necessary to effect the double-reading preventing function, in addition to the time required for symbol detection which must be performed prior to decoding. Moreover, in the embodiment, double-reading is prevented even when a sheet with the symbol 54 is left on the reading apparatus. Further, the method according to the embodiment is very preferable in consideration of the number of components and/or operability, since an additional component such as a switch is unnecessary.

In addition, as is explained above, in the embodiment, when the bar code symbol 54 is not found in the image stored in the frame memory 60 even after detection of the symbol is performed two consecutive times, the decode-permitting flag 66 is set, which indicates that the symbol 54 is removed from the reading apparatus. This being so, the invention is free from the following disadvantages: when the reading apparatus or the bar code symbol 54 is vibrated for some reason, and an image of the symbol is stored in the frame memory 60 during vibration, it may be determined that no symbol exists even if the symbol 54 is not removed from the apparatus; if the symbol 54 stops moving for a short time when it is being removed from the apparatus after it is decoded (when the symbol is being moved, it is determined not to exist since its image is blurred), the symbol 54 may be decoded once again, i.e., double-reading may be performed.

As described above, in the ninth embodiment, when the symbol 54 is not found in the image stored in the frame memory 60 even after detection is performed two consecutive times, it is determined that the symbol 54 has been removed from the apparatus, and the decode-permitting flag 66 is set. However, the double-reading preventing function can be realized by modifying the method such that the flag 66 is set, indicating that the symbol has been removed, if the symbol is not found after detection is performed once. However, the method of the ninth embodiment, in which the flag 66 is set when the symbol is not found even after detection is performed two consecutive times, is effective to prevent double reading in the above-described cases—in the case where it may be determined that no symbol exists even if the symbol 54 is not removed from the apparatus, when the reading apparatus or the bar code symbol 54 is vibrated for some reason, and an image of the symbol is stored in the frame memory 60 during vibration; in the case where the symbol 54 may be decoded once again, i.e., double-reading may be performed, if the symbol 54 stops moving for a short time when it is being removed from the apparatus after it is decoded. Furthermore, the ninth embodiment is not limited to the above, but a similar advantage can be obtained by modifying such that it is determined that the symbol has been removed, when the symbol is not found even after detection is preformed three consecutive times.

In practice, a reading cycle to perform processing from storing an image of the symbol 54 in the frame memory 60 to determination as to whether the symbol 54 exists greatly affects the reliability of the apparatus. Specifically, if the reading cycle is too long, it is possible that the symbol 54 is exchanged by a new one between steps S99 to S102 before it is decoded. Thus, in the ninth embodiment, the reading cycle is set to about 0.3 sec.

Tenth Embodiment

Though in the ninth embodiment, the bar code symbol 54 is detected in successively-read images, a similar advantage can be obtained if the frame memory 60 has a memory capacity corresponding to, for example, two frames, and stores images in both frames at regular intervals. In this case, the decode-permitting flag 66 is set when the bar code symbol 54 is not found in both frames.

Eleventh Embodiment

The types of bar code symbols to be read are not limited to particular ones in the first through tenth embodiments. There are various methods suitable for the JAN/UPC/EAN code, ITF (Interleaved 2 of 5) code, CODE39, NW-7 code, CODE128, etc., and two-dimensional bar code symbols (CODE16K, CODE49, PDF417, DATA CODE, etc.), respectively.

In summary, though the reading apparatuses according to the above embodiments are applicable to various types of bar code symbols, they are especially useful to deal with two-dimensional bar code symbols which require long reading time.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A bar code symbol reading apparatus comprising:
   scanning/storing means for scanning a bar code symbol at regular intervals, and for storing image data corresponding to scanned bar code symbols;
   position detecting means for detecting the position of the bar code symbol from the image data stored in said scanning/storing means;
   first position-storing means for storing a first position data indicating the position of the bar code symbol detected by said position detecting means;
   second position-storing means for storing a second position data indicating the position of the bar code symbol detected by said position detecting means prior to the first position data;
   comparing means for comparing the first position data stored in said first position-storing means with the second position data stored in said second position-storing means; and
   decoding means for decoding the bar code symbol on the basis of the image data stored in said scanning/storing means when it is determined by said comparing means that the first and second position data differ from each other.

2. The apparatus according to claim 1, wherein said decoding means includes:
   decode-processing means for decoding the bar code symbol on the basis of the image data stored in said scanning/storing means; and
   control means for supplying said decode-processing means with a decode-permitting signal for instructing a start of decoding when it is determined by said comparing means that the first and second position data differ from each other.

3. The apparatus according to claim 2, wherein said position detecting means includes four-corner detecting means for detecting the coordinates of at least one of the four corners of the bar code symbol, and supplies said first position-storing means with the detected data as the first position data.

4. The apparatus according to claim 2, wherein said control means includes means for supplying said decode-processing means with the decode-permitting signal when it is determined by said comparing means that the first and second position data differ from each other and that the first and second position data indicate that one of the detected bar code symbols cannot be obtained by displacing the other bar code symbol in a parallel manner.

5. The apparatus according to claim 4, wherein said position detecting means includes four-corner detecting means for detecting the coordinates at least one of the four corners of the bar code symbol, and supplies said first position-storing means with the detected data as the first position data.

6. The apparatus according to claim 1, wherein said decoding means includes:
   decode-processing means for decoding the bar code symbol on the basis of the image data stored in said scanning/storing means; and
   control means for supplying said decode-processing means with a decode-permitting signal for instructing a start of decoding, when said comparing means determines that the first and second position data differ from each other, and thereafter determines that the first and second position data differs from each other, which are responded to a next scanning and storing of said scanning/storing means.

7. The apparatus according to claim 6, wherein said position detecting means includes four-corner detecting means for detecting the coordinates at least one of the four corners of the bar code symbol, and supplies said first position-storing means with the detected data as the first position data.

8. A double-reading preventing device for use in a bar code symbol reading apparatus, comprising:
   position detecting means for detecting the position of a bar code symbol from image data obtained as a result of a picking up of the bar code symbol at regular intervals;
   first memory means for storing a first position data indicating the position of the bar code symbol detected by said position detecting means at a first time period;
   second memory means for storing a second position data indicating the position of the bar code symbol detected by said position detecting means at a second time period prior to the first time period;
   comparing means for comparing the first position data stored in said first memory means with the second position data stored in said second memory means; and control means for generating a decode-permitting signal when the comparing means determines that the first and second position data differ from each other.

9. The apparatus according to claim 8, wherein said position detecting means includes four-corner detecting means for detecting the coordinates at least one of the four corners of the bar code symbol, and supplies said first memory means with the detected data as the first position data.

10. The apparatus according to claim 8, wherein said control means includes means for generating the decode-permitting signal when it is determined by said comparing means that the first and second position data differ from each other and that the first and second position data indicate that one of the detected bar code symbols cannot be obtained by displacing the other bar code symbol in a parallel manner.

11. The apparatus according to claim 10, wherein said position detecting means includes four-corner detecting means for detecting the coordinates at least one of the four corners of the bar code symbol, and supplies said first memory means with the detected data as the first position data.

12. The apparatus according to claim 8, wherein said control means includes means for generating the decode-permitting signal when said comparing means determines that the first and second position data differ from each other, and thereafter determines that the first and second position data differs from each other, which are responded to a next detecting of said position detecting means at a third time period next to the first time period.

13. The apparatus according to claim 12, wherein said position detecting means includes four-corner detecting means for detecting the coordinates at least one of the four corners of the bar code symbol, and supplies said first memory means with the detected data as the first position data.

14. A bar code symbol reading apparatus comprising:
pick-up means for picking up a bar code symbol consisting of bars and spaces;
bar code symbol detecting means for determining that the bar code symbol exists by detecting that all four corners of the bar code symbol exist, based on an output signal from said pick-up means;
bar code symbol decoding means for interpreting the content of the bar code symbol from an image of the bar code symbol obtained by said pick-up means; and
control means for permitting said bar code symbol decoding means to perform a further operation, when said bar code symbol detecting means detects that no bar code symbol exists at least one time after said bar code symbol decoding means decodes the bar code symbol.

15. The apparatus according to claim 14, wherein said control means includes:
state-holding means for holding a state data indicative of a decode-permitting or decode-inhibiting state; and
state-controlling means for causing said state-holding means to store data indicative of the decode inhibiting state as the state data after said bar code symbol decoding means performs symbol decoding, and thereafter causing said state-holding means to store data indicative of the decode-permitting state as the state data when said bar code symbol detecting means detects no bar code symbol at least one time; and
wherein said bar code symbol decoding means interprets the content of the bar code symbol from an image of the bar code symbol obtained by said pick-up means, only when the state data stored in the state-holding means indicates the decode-permitting state.

16. The apparatus according to claim 15, wherein said state-controlling means includes means for causing said state-holding means to store data indicative of the decode-permitting state as the state data, when said bar code symbol detecting means detects no bar code symbol two consecutive times after said bar code symbol decoding means decodes the bar code symbol and then said state-holding means stores data indicative of the decode-inhibiting state as the state data.

17. A bar code symbol reading apparatus comprising:
pick-up means for picking up a bar code symbol consisting of bars and spaces;
bar code symbol detecting means for determining whether or not the bar code symbol exists based on an output signal from said pick-up means;
bar code symbol decoding means for interpreting the content of the bar code symbol from an image of the bar code symbol obtained by said pick-up means;
control means for permitting said bar code symbol decoding means to perform a further operation, when said bar code symbol detecting means detects that no bar code symbol exists at least one time after said bar code symbol decoding means decodes the bar code symbol;
said control means including:
state-holding means for holding a state data indicative of a decode-permitting or decode-inhibiting state;
state-controlling means for causing said state-holding means to store data indicative of the decode-inhibiting state as the state data after said bar code symbol decoding means performs symbol decoding, and thereafter causing said state-holding means to store data indicative of the decode-permitting state as the state data when said bar code symbol detecting means detects no bar code symbol at least one time; and
wherein said bar code symbol decoding means interprets the content of the bar code symbol from an image of the bar code symbol obtained by said pick-up means, only when the state data stored in the state-holding means indicates the decode-permitting state: and
said state-controlling means including means for causing said state-holding means to store data indicative of the decode-permitting state as the state data, when said bar code symbol detecting means detects no bar code symbol two consecutive times after said bar code symbol decoding means decodes the bar code symbol and then said state-holding means stores data indicative of the decode-inhibiting state as the state data.

* * * * *